United States Patent
Lee et al.

(10) Patent No.: US 7,953,400 B2
(45) Date of Patent: May 31, 2011

(54) AUTOMATIC PAIRING METHOD FOR BLUETOOTH®-ENABLED MOBILE TERMINAL

(75) Inventors: Seung Jai Lee, Goyang-si (KR); Suk Ryun Son, Seoul (KR); Young Ah Lee, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 11/858,869

(22) Filed: Sep. 20, 2007

(65) Prior Publication Data

US 2008/0076389 A1    Mar. 27, 2008

(30) Foreign Application Priority Data

Sep. 22, 2006   (KR) .................. 10-2006-0092225

(51) Int. Cl.
*H04M 3/00* (2006.01)
(52) U.S. Cl. .............. 455/418; 455/41.2; 455/435.1; 370/328
(58) Field of Classification Search .............. 455/411, 455/41.2, 435.1, 418; 370/328
See application file for complete search history.

(56) References Cited

U.S. PATENT DOCUMENTS

| | | | |
|---|---|---|---|
| 2006/0029015 A1* | 2/2006 | Hinsey | 370/328 |
| 2006/0094461 A1* | 5/2006 | Hameed et al. | 455/552.1 |
| 2006/0116107 A1* | 6/2006 | Hulvey | 455/411 |
| 2006/0194609 A1* | 8/2006 | Matsuo | 455/552.1 |

* cited by examiner

*Primary Examiner* — Danh C Le
(74) *Attorney, Agent, or Firm* — H.C. Park & Associates, PLC

(57) ABSTRACT

An automatic pairing method for a Bluetooth®-enabled mobile includes checking whether automatic authentication information has been received from a Bluetooth®-enabled appliance in response to an automatic pairing command, receiving pairing information from the Bluetooth®-enabled appliance and registering the Bluetooth®-enabled appliance as a slave if automatic authentication information is received, and establishing a Bluetooth® connection to the Bluetooth®-enabled appliance registered as a slave.

18 Claims, 6 Drawing Sheets

AUTOMATIC PAIRING METHOD FOR BLUETOOTH®-ENABLED MOBILE TERMINAL

CROSS REFERENCE TO RELATED APPLICATION

This application claims priority from and the benefit of Korean Patent Application No. 10-2006-0092225, filed Sep. 22, 2006, which is hereby incorporated herein by reference for all purposes as if fully set forth herein.

BACKGROUND OF THE INVENTION

1. Field of the Invention

The present invention relates to Bluetooth® pairing and, more particularly, to an automatic pairing method for a Bluetooth®-enabled mobile terminal, wherein Bluetooth® pairing may be performed automatically without direct user input of a passkey or personal identification number (PIN).

2. Discussion of the Background

Advances in information and communication technologies have increased the popularity of mobile terminals. In addition to basic phone call processing, advanced mobile terminals support various functions, such as music playing and digital broadcast reception. In order to avoid causing annoyance to other persons in public places, headsets may be used during calls, while listening to music, and during digital broadcast reception.

Bluetooth® technology may be used to wirelessly connect a mobile terminal and a headset, thereby eliminating inconvenience due to a long wire connecting the mobile terminal and the headset. To establish a wireless connection between a mobile terminal and headset, the user may have to input a PIN to the mobile terminal. This may result in a long delay when the user switches between different headsets. Also, the headset may have to repeat an inquiry procedure to find a Bluetooth®-enabled mobile terminal in the range, which may increase power consumption. Further, if multiple Bluetooth®-enabled mobile terminals are present in the range, the headset may connect to the mobile terminal having the highest radio frequency signal level in the area instead of to the user's mobile terminal.

SUMMARY OF THE INVENTION

The present invention provides an automatic pairing method for a Bluetooth®-enabled mobile terminal, wherein a Bluetooth® pairing procedure may be simplified.

The present invention also provides an automatic pairing method wherein switching between different headsets may be performed rapidly through an automatic pairing key.

The present invention further provides an automatic pairing method wherein preset buttons may be simultaneously pressed to initiate Bluetooth® pairing between a mobile terminal and a headset so as to reduce power consumption of the headset in an inquiry procedure.

The present invention further provides an automatic pairing method wherein preset buttons may be simultaneously pressed to initiate Bluetooth® pairing between a mobile terminal and a headset so as to prevent undesired connections with other Bluetooth®-enabled devices.

Additional features of the invention will be set forth in the description which follows, and in part will be apparent from the description, or may be learned by practice of the invention.

The present invention discloses an automatic pairing method for a mobile terminal including checking whether automatic authentication information has been received from a Bluetooth®-enabled appliance in response to an automatic pairing command, receiving pairing information from the Bluetooth®-enabled appliance and registering the Bluetooth®-enabled appliance as a slave if automatic authentication information has been received, and establishing a Bluetooth® connection to the Bluetooth®-enabled appliance registered as a slave.

The present invention also discloses an automatic pairing method for a mobile terminal, including checking whether a Bluetooth®-enabled appliance supports automatic pairing in response to an automatic pairing command, sending automatic authentication information to the mobile terminal if the Bluetooth®-enabled appliance supports automatic pairing, sending pairing information to the mobile terminal, and establishing a Bluetooth® connection between the Bluetooth®-enabled appliance, as a slave, and the mobile terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
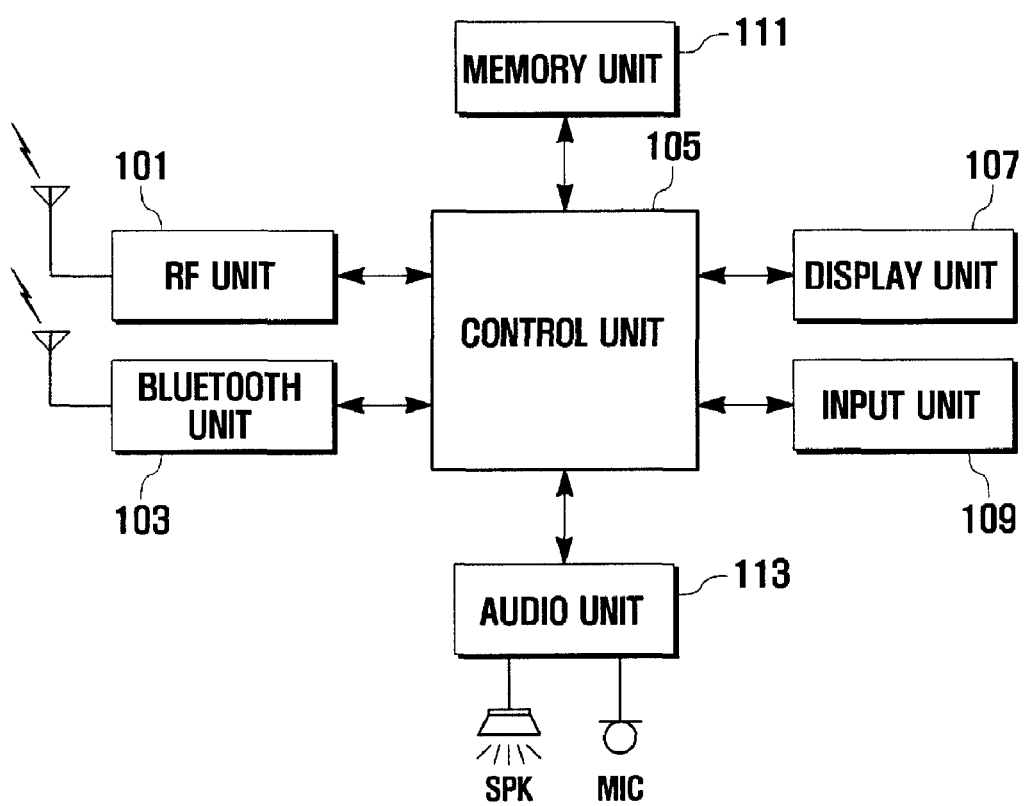
FIG. 1 shows a configuration of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

For the purpose of description, a Bluetooth®-enabled mobile terminal is described as an example of a mobile terminal of the present invention. That is, the mobile terminal of the exemplary embodiments of the present invention is a Bluetooth®-enabled terminal but may alternatively be any information and communication appliance or multimedia appliance, such as a mobile communication terminal, a mobile phone, a personal digital assistant (PDA), a smart phone, a notebook, or a personal computer.

A Bluetooth®-enabled headset is used as an example of a companion device. That is, the headset of the exemplary embodiments of the present invention is a Bluetooth®-enabled headset but may alternatively be an ear-set, a headphone, a stereo headset, or a set of speakers.

The term "automatic authentication information" refers to authentication information for a Bluetooth® pairing protocol or program enabling automatic pairing. The term 'registration' refers to Bluetooth® pairing. The term 'pairing information' refers to a passkey or PIN of the headset for Bluetooth® pairing with a mobile terminal.

FIG. 1 shows a configuration of a mobile terminal according to an exemplary embodiment of the present invention.

Referring to FIG. 1, the mobile terminal includes a radio frequency (RF) unit 101, a Bluetooth® unit 103, a control unit 105, a display unit 107, an input unit 109, a memory unit 111, and an audio unit 113.

The RF unit 101 performs wireless communication operations for the mobile terminal. For example, the RF unit 101 may send and receive voice calls and text or multimedia messages through a mobile communication network.

The Bluetooth® unit 103 communicates with another Bluetooth®-enabled device according to the Bluetooth® protocol. The Bluetooth® unit 103 may store a Bluetooth® host stack for Bluetooth® communication and Bluetooth® profiles and application programs corresponding to functions and conditions of external Bluetooth®-enabled devices.

The control unit 105 controls the overall operation of the mobile terminal. The control unit 105 may include a modulator/demodulator (modem) and a coder/decoder (codec) to modulate and code a signal to transmit through the RF unit 101 and demodulate and decode a signal received through the RF unit 101.

The display unit 107 may display operation states, operation results, and various other information of the mobile terminal and is controlled by the control unit 105. The display unit 107 may include a panel including display devices such as liquid crystal display (LCD) devices or organic light emitting diodes (OLED).

The input unit 109 may include a keypad, a touch screen, a touch pad, and a scroll wheel. The input unit 109 may input a signal to control the mobile terminal and may send the input signal to the control unit 105. In particular, when a particular key is pressed and held down for a preset duration (for example, 3~4 seconds) when the mobile terminal is in an idle state, the input unit 109 recognizes an automatic pairing command and sends the recognized automatic pairing command to the control unit 105.

The memory unit 111 stores menus and setting information for the operation of the mobile terminal. In particular, the memory unit 111 may store information regarding automatic authentication (for example, information regarding a program and protocol for automatic authentication).

The audio unit 113 may convert an analog audio signal from a microphone MIC into a digital signal and may convert a digital audio signal from the control unit 105 into an analog audio signal for reproduction through a speaker SPK.

Figure 2:
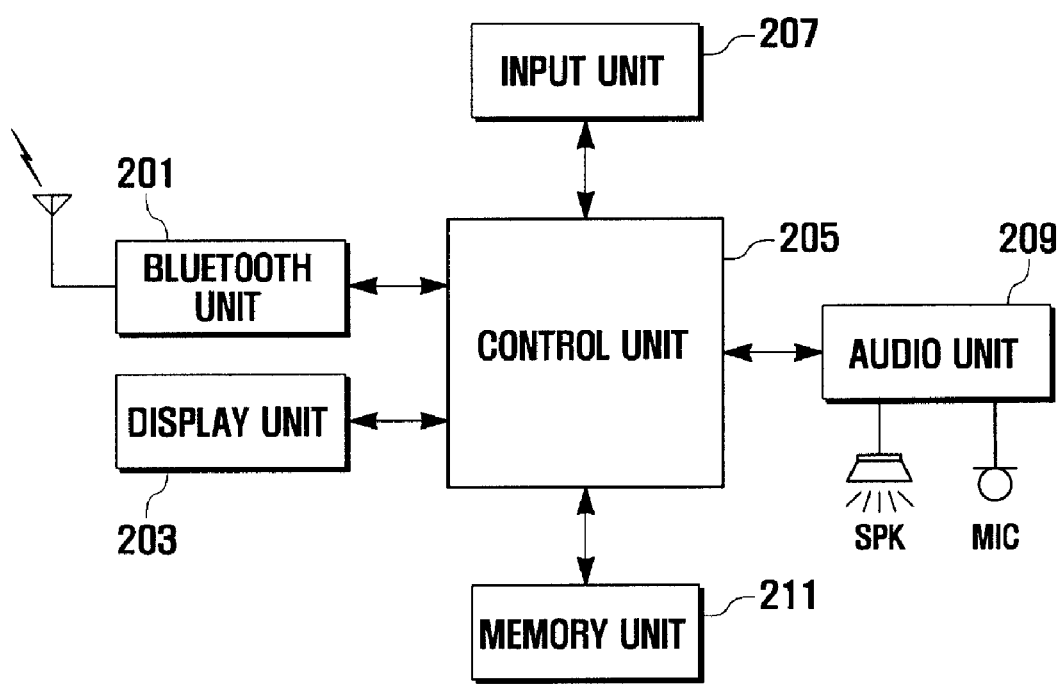
FIG. 2 shows a configuration of a headset according to an exemplary embodiment of the present invention.

FIG. 2 shows a configuration of a headset according to an exemplary embodiment of the present invention.

Referring to FIG. 2, the headset includes a Bluetooth® unit 201, a display unit 203, a control unit 205, an input unit 207, an audio unit 209, and a memory unit 211.

The Bluetooth® unit 201 may communicate with another Bluetooth®-enabled device through a Bluetooth antenna according to the Bluetooth® protocol. The Bluetooth® unit 201 may store a Bluetooth® host stack for Bluetooth® communication and Bluetooth® profiles and application programs corresponding to functions and conditions of external Bluetooth®-enabled devices. In particular, the Bluetooth® unit 201 communicates with a mobile terminal.

The display unit 203 may display operation states and operation results of the headset under the control of the control unit 205. The display unit 203 may include a lamp of light-emitting diodes.

The control unit 205 controls the overall operation of the headset.

The input unit 207 includes buttons. For example, the input unit 207 may include a multi-function button for various functions and a volume control button. The input unit 207 may input a signal to control the headset and send the input signal to the control unit 205. In particular, the input unit 207 may recognize different commands according to the duration for which the multi-function button is held down. That is, when the multi-function button is pressed and held down for 1~2 seconds, 3~4 seconds, or above 5 seconds, the input unit 207 may recognize a call/end command, an on/off command, or an automatic pairing command, respectively, and then send the recognized command to the control unit 205.

The audio unit 209 may convert an analog audio signal from a microphone MIC into a digital signal and may convert a digital audio signal from the control unit 205 into an analog audio signal for reproduction through a speaker SPK.

The memory unit 211 may store setting information for the operation of the headset (for example, mappings of commands corresponding to different durations of holding a button down). In particular, the memory unit 211 may store information regarding automatic authentication (for example, information regarding a program and protocol for automatic authentication), and pairing information (for example, a passkey or PIN for Bluetooth® pairing).

Figure 3:
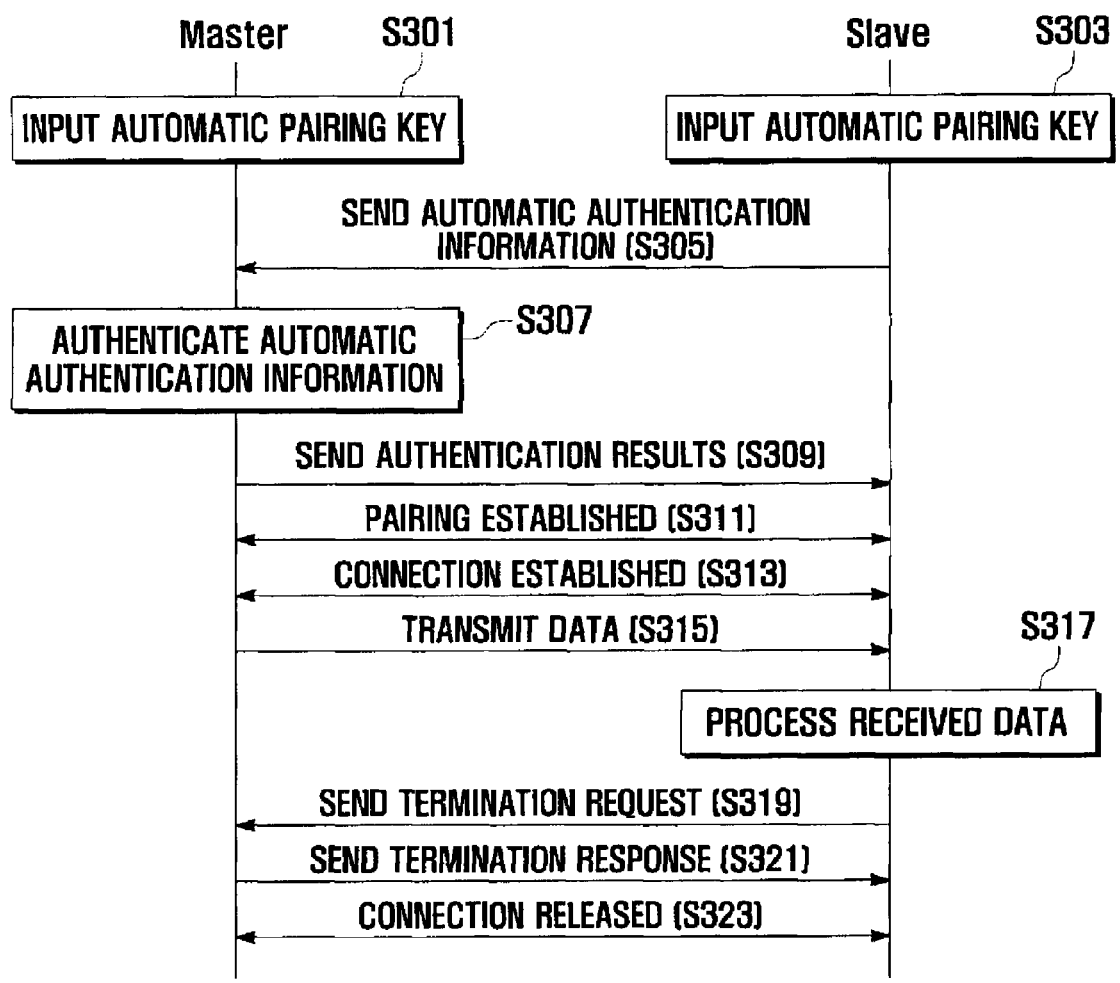
FIG. 3 is a sequence diagram showing an automatic pairing method according to an exemplary embodiment of the present invention.

FIG. 3 is a sequence diagram showing an automatic pairing method according to an exemplary embodiment of the present invention.

Referring to FIG. 3, when an automatic pairing key is input to a master device (i.e. a mobile terminal) (S301) and the automatic pairing key is also input to a slave device (i.e. a headset) (S303), the control unit 205 of the headset sends automatic authentication information through the Bluetooth® unit 201 to the mobile terminal (S305). The automatic authentication information may be sent as a part of a Bluetooth® device address that is transmitted when the headset is registered as a slave in the mobile terminal or may be sent before transmission of the Bluetooth® device address.

Upon receipt of the automatic authentication information, the control unit 105 of the mobile terminal authenticates the headset using the received automatic authentication information (S307). The control unit 105 sends authentication results to the headset (S309). If the authentication results indicate that the headset may be automatically paired with the mobile terminal, a pairing between the headset and the mobile terminal is established and the headset is registered as a slave in the mobile terminal (S311). Thereafter, a Bluetooth® connection between the headset and the mobile terminal is established (S313).

After the Bluetooth® connection is established, the mobile terminal transmits data to the headset (S315) and the headset receives and processes the data (S317).

When the headset sends a connection termination request to the mobile terminal (S319), the mobile terminal sends a connection termination response to the headset (S321) and releases the Bluetooth® connection (S323).

Figure 4:
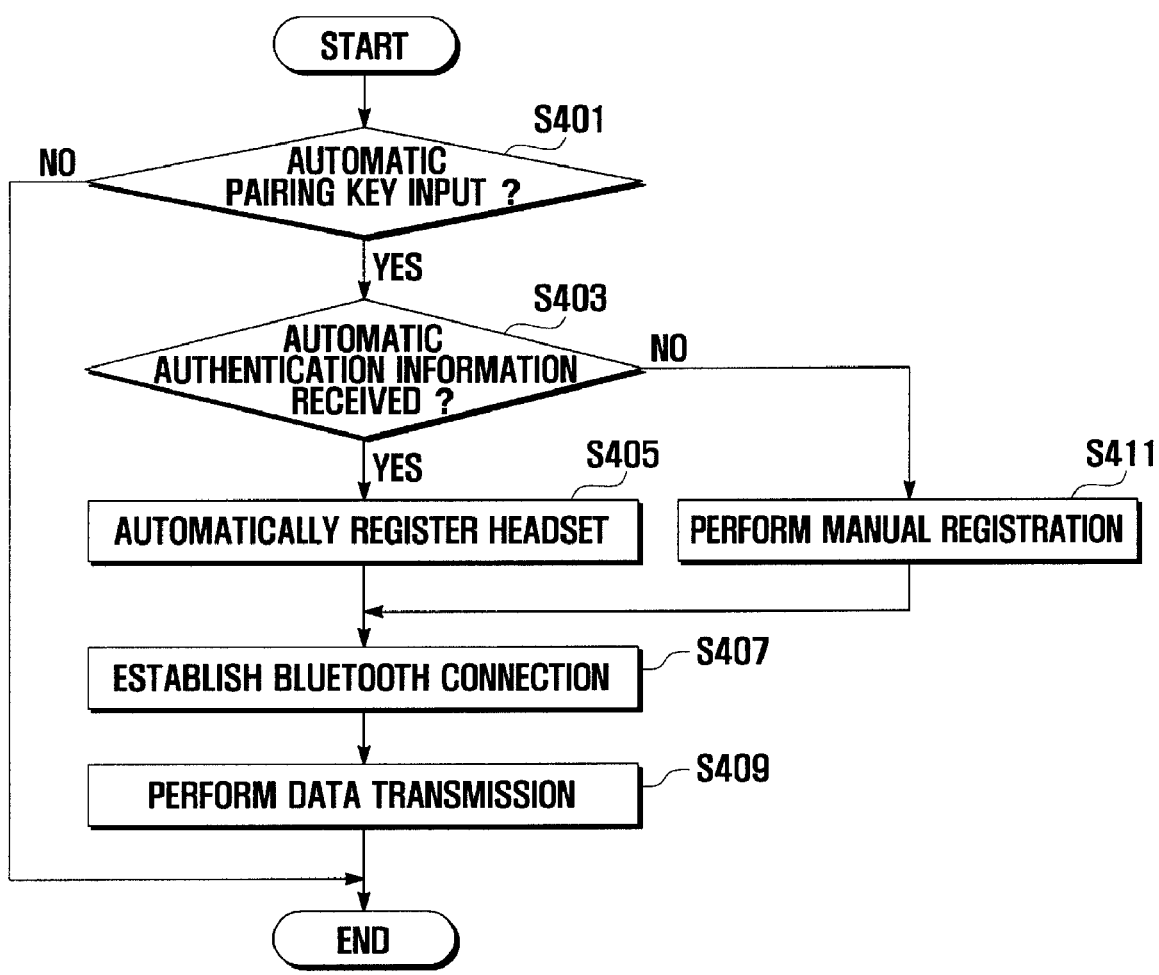
FIG. 4 is a flow chart showing a procedure performed by a mobile terminal in the method of FIG. 3.

FIG. 4 is a flow chart showing a procedure performed by a mobile terminal in the automatic pairing method of FIG. 3.

Referring to FIG. 4, the control unit 105 of the mobile terminal checks whether an automatic pairing key has been input through the input unit 109 (S401). The input of the automatic pairing key corresponds to the holding down of a preset key (for example, an 'OK' key) for an extended duration while the mobile terminal is in an idle state and causes the mobile terminal to enter an automatic Bluetooth® pairing mode.

If the automatic pairing key is input, the control unit 105 checks whether automatic authentication information from a headset, which is to be a slave, has been received (S403). Automatic authentication information indicates that the headset may be automatically paired with the mobile terminal.

If automatic authentication information from the headset has been received, the control unit 105 of the mobile terminal automatically registers the headset as a slave (S405).

If automatic authentication information from the headset has not been received within a preset duration, the control unit 105 of the mobile terminal manually registers the headset as a slave (S411). At step S411, pairing information (i.e. PIN or passkey necessary for Bluetooth® pairing) may be input through the input unit 109. The control unit 105 authenticates the headset using the pairing information and registers the headset as a slave if the authentication is successful.

After registration, the control unit 105 controls the Bluetooth® unit 103 to establish a Bluetooth® connection to the headset (S407). The control unit 105 sends requested data through the Bluetooth® unit 103 to the headset, which then processes the data from the mobile terminal (S409).

Figure 5:
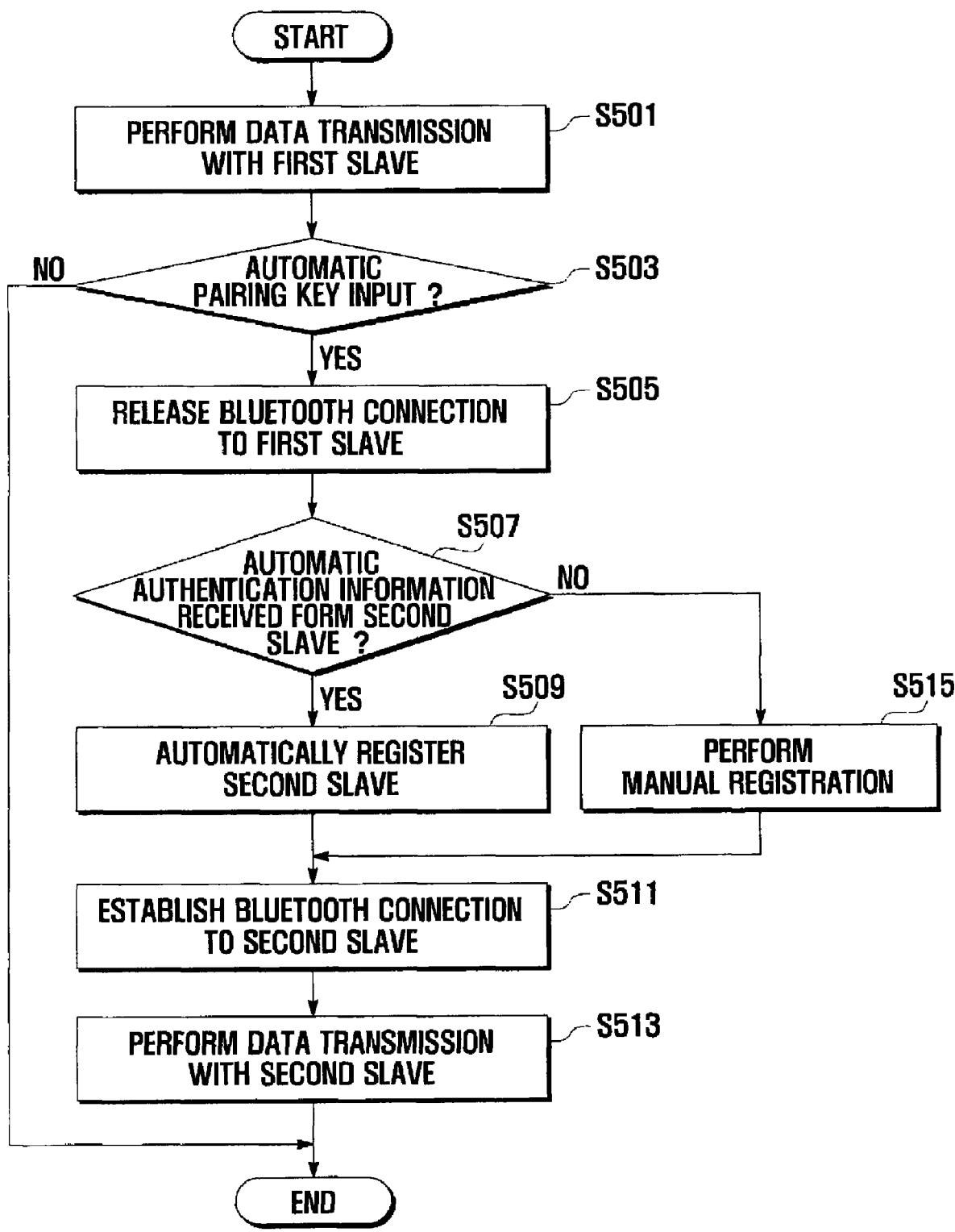
FIG. 5 is a flow chart showing a device switching procedure in the method of FIG. 3.

FIG. 5 is a flow chart showing a device switching procedure for the automatic pairing method of FIG. 3.

Referring to FIG. 5, when the mobile terminal communicates with a first slave (i.e. headset) through a Bluetooth® connection (S501), the control unit 105 of the mobile terminal checks whether an automatic pairing key has been input through the input unit 109 (S503). The Bluetooth® connection has been established through the procedure of FIG. 4. The input of the automatic pairing key corresponds to the holding down of a preset key (for example, 'OK' key) for an extended duration while the mobile terminal is in an idle state and causes the mobile terminal to enter an automatic Bluetooth® pairing mode.

If the automatic pairing key has been input through the input unit 109, the control unit 105 releases the Bluetooth® connection to the first headset (S505).

The control unit 105 checks whether automatic authentication information from a second headset, which is to be a slave, is received (S507). Automatic authentication information indicates that the mobile terminal may be automatically paired with the second headset.

If automatic authentication information from the second headset is received, the control unit 105 of the mobile terminal automatically registers the second headset as a second slave (S509).

If automatic authentication information from the second headset is not received within a preset duration, the control unit 105 of the mobile terminal manually registers the second headset as a second slave (S515). At step S515, pairing information (PIN code or passkey necessary for Bluetooth® pairing) is input through the input unit 109. The control unit 105 authenticates the second headset using the pairing information and registers the second headset as a second slave if the authentication is successful.

After registration of the second headset, the control unit 105 controls the Bluetooth® unit 103 to establish a Bluetooth® connection to the second slave (S511). The control unit 105 sends requested data through the Bluetooth® unit 103 to the second slave, which then processes the data from the mobile terminal (S513).

Figure 6:
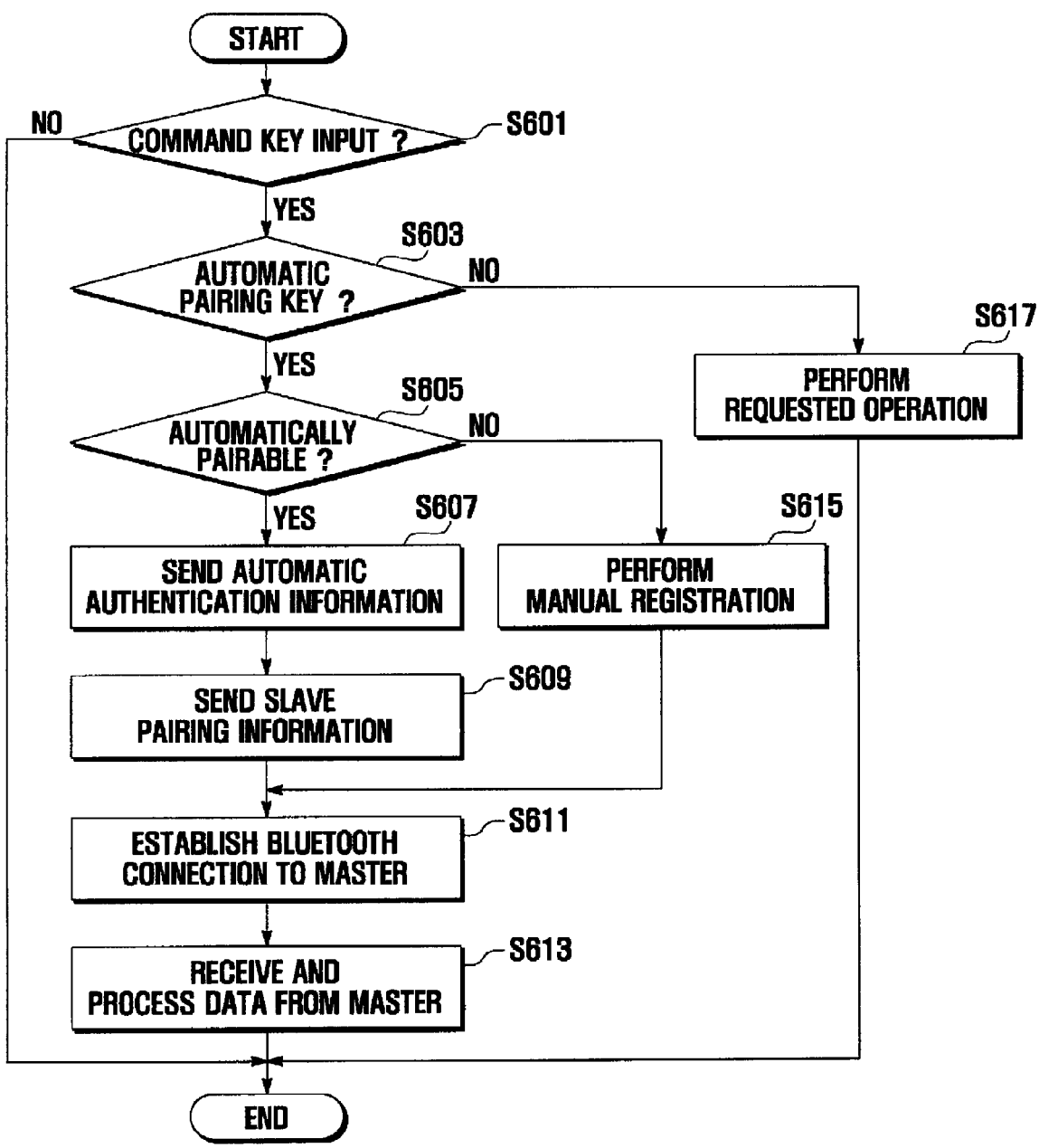
FIG. 6 is a flow chart showing a procedure performed by a headset in the method of FIG. 3.

FIG. 6 is a flow chart showing a procedure performed by a headset for the automatic pairing method of FIG. 3.

Referring to FIG. 6, the control unit 205 of the headset checks whether a command key has been input through the input unit 207 (S601). The input unit 207 may include a multi-function button and volume control button. In particular, the input unit 207 may recognize different commands according to different durations for which the multi-function button is held down. For example, when the multi-function button is held down for 1~2 seconds, 3~4 seconds, or above 5 seconds, the input unit 207 recognizes a call/end command, an on/off command, or an automatic pairing command, respectively, and may send the recognized command to the control unit 205.

If a command key is input, the control unit 205 checks whether the input command key is an automatic pairing command (S603). If the input command key is not an automatic pairing command, the control unit 205 performs a requested operation (S617). If the input command key is an automatic pairing command, the control unit 205 checks if the headset can be automatically paired with the mobile terminal (S605).

If the headset can be automatically paired with the mobile terminal, the control unit 205 sends automatic authentication information through the Bluetooth® unit 201 to the mobile terminal (S607) and sends pairing information (i.e. PIN or passkey necessary for Bluetooth® pairing) through the Bluetooth® unit 201 to the mobile terminal (S609), thereby performing automatic registration to the mobile terminal. The automatic authentication information may be sent as a part of a Bluetooth® device address of the headset when the Bluetooth® device address is transmitted or may be sent before transmission of the Bluetooth® device address.

If the headset cannot be automatically paired with the mobile terminal at step S605, the control unit 205 manually registers the mobile terminal (S615). At step S615, the control unit (205) transmits the headset's pairing information (i.e. PIN or passkey necessary for Bluetooth pairing) to the mobile terminal. The mobile terminal registers the headset as a slave using the transmitted headset's pairing information.

After registration, the control unit 205 establishes a Bluetooth® connection to the mobile terminal acting as a master (S611) and receives and processes data from the mobile terminal (S613).

As apparent from the above description, the present invention provides an automatic pairing method for a Bluetooth®-enabled mobile terminal. Thereby, Bluetooth® pairing may be performed through a simplified procedure. Switching between different headsets may be performed rapidly using an automatic pairing key. Preset buttons may be simultaneously pressed to initiate Bluetooth® pairing between a mobile terminal and a headset to reduce power consumption by avoiding the need for an inquiry procedure and to prevent an undesired connection between Bluetooth®-enabled devices.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for providing an automatic pairing, the method comprising:
   checking whether automatic authentication information has been received from a Bluetooth®-enabled appliance in response to detection of a key button of a mobile terminal being pressed associated with an automatic pairing command, wherein different commands are determined to specify types of the commands upon detection of a signal associated with a key button of the Bluetooth®-enabled appliance being pressed according to a duration of threshold time, and wherein the different commands comprise a call initiation command, a call end command, on/off command and automatic pairing and releasing command;
   receiving pairing information from the Bluetooth®-enabled appliance and initially registering the Bluetooth®-enabled appliance as a slave without inputting a password comprising a Personal Identification Number (PIN) in response to receipt of automatic authentication information; and
   establishing a Bluetooth® connection to the Bluetooth®-enabled appliance registered as a slave.

2. The method of claim 1, further comprising:
   registering the Bluetooth®-enabled appliance through a manual procedure in response to failing to receive the automatic authentication information.

3. The method of claim 1, wherein the automatic authentication information comprises authentication information indicating whether the Bluetooth®-enabled appliance supports automatic pairing.

4. The method of claim 1, wherein the pairing information is a registration number comprising a passkey or personal identification number for Bluetooth® pairing.

5. The method of claim 1, further comprising:
   transmitting data through the Bluetooth® connection to the Bluetooth®-enabled appliance.

6. The method of claim 5, wherein the data comprises voice data or music data.

7. The method of claim 1, wherein the Bluetooth®-enabled appliance is a headset, a hands-free headset, a stereo headset, or a set of speakers capable of Bluetooth® communication with the mobile terminal.

8. The method of claim 1, wherein checking whether automatic authentication information has been received from a Bluetooth®-enabled appliance comprises detection of both the key button of the mobile terminal and the key button of the Bluetooth®-enabled appliance being pressed simultaneously.

9. An automatic pairing method associated with a Bluetooth®-enabled appliance, the method comprising:
   determining whether the Bluetooth®-enabled appliance supports automatic pairing in response to detection of a button being pressed for threshold time associated with an automatic pairing command, wherein different commands are determined to specify types of the commands upon detection of a signal associated with a key button of the Bluetooth®-enabled appliance being pressed according to a duration of threshold time, and wherein the different commands comprise a call initiation command, a call end command, on/off command and automatic pairing and releasing command;
   sending an automatic authentication information to a mobile terminal if the Bluetooth®-enabled appliance is determined to support automatic pairing;
   sending pairing information to the mobile terminal and initially being registered as a slave without inputting a password comprising a Personal Identification Number (PIN); and
   establishing a Bluetooth® connection between the Bluetooth®-enabled appliance, as a slave, and the mobile terminal.

10. The automatic pairing method of claim 9, further comprising:
    registering the Bluetooth®-enabled appliance in the mobile terminal through a manual procedure if the Bluetooth®-enabled appliance is determined failing to support automatic pairing.

11. The automatic pairing method of claim 9, wherein the automatic authentication information comprises authentication information indicating that the Bluetooth®-enabled appliance supports automatic pairing.

12. The automatic pairing method of claim 9, wherein the pairing information is a registration number comprising a passkey or personal identification number for Bluetooth® pairing.

13. The automatic pairing method of claim 12, wherein the Bluetooth®-enabled appliance comprises a headset, a hands-free headset, a stereo headset, or a set of speakers capable of Bluetooth® communication with the mobile terminal.

14. The automatic pairing method of claim 9, wherein the detection specifies different commands comprises detection of a signal associated with the key button of the Bluetooth®-enabled appliance being pressed according to a duration of threshold time, wherein the different commands comprise a call initiation command, a call end command, on/off command and automatic pairing and releasing command.

15. The automatic pairing method of claim 14, wherein determining whether the Bluetooth®-enabled appliance supports automatic pairing comprises detection of both the key button of the mobile terminal and the key button of the Bluetooth®-enabled appliance being pressed simultaneously.

16. An apparatus, comprising:
    an input unit configured to receive a signal associated with a key button being pressed to initiate automatic pairing and switching the automatic paring of a plurality of Bluetooth®-enabled devices comprising a first device and a second device, the key button of the apparatus being pressed is detected to determine whether the second device is supporting the automatic pairing in a wireless communication over short wavelength radio transmissions, wherein the first device is released from Bluetooth® connection, wherein different commands are specified upon detection of a signal associated with a key button of the first device or the second device being pressed according to a duration of threshold time, wherein the different commands comprise a call initiation command, a call end command, on/off command and automatic pairing and releasing command; and
    in response to receipt of the determination, a processor configured to cause the second device to send automatic authentication information, wherein the processor is further configured to establish Bluetooth® connection to the second device and to perform data transmission with the second device.

17. The apparatus of claim 16, wherein determine whether the second device is supporting the automatic pairing comprises detection of both the key button of a mobile terminal and the key button of the mobile terminal and first device or the second device being pressed simultaneously.

18. The apparatus of claim 16, wherein the processor is configured to register the second device through a manual procedure in response to failing to receipt of the automatic authentication information from the second device for threshold time, the manual procedure comprising to receive pairing information from the input unit, and wherein the pairing information comprise a registration number comprising one of a passkey or personal identification number for Bluetooth® pairing.

* * * * *